United States Patent [19]
Cooke et al.

[11] 3,930,820
[45] Jan. 6, 1976

[54] STRENGTHENING SHEET GLASS BY ION EXCHANGE

[75] Inventors: William C. Cooke; Albert H. Agett, both of Kingsport, Tenn.

[73] Assignee: ASG Industries Inc., Kingsport, Tenn.

[22] Filed: June 11, 1974

[21] Appl. No.: 478,384

[52] U.S. Cl. .............................. 65/30 E; 427/431
[51] Int. Cl.² ........................................ C03C 21/00
[58] Field of Search ................ 65/30 E; 427/431

[56] References Cited
UNITED STATES PATENTS

| | | | |
|---|---|---|---|
| 3,415,637 | 12/1968 | Glynn | 65/30 E |
| 3,441,398 | 4/1969 | Hess | 65/30 E |
| 3,627,491 | 12/1971 | Boffe et al. | 65/30 E |
| 3,650,720 | 3/1972 | Grego et al. | 65/30 E |
| 3,791,809 | 2/1974 | Lau | 65/30 E |

*Primary Examiner*—Robert L. Lindsay, Jr.
*Attorney, Agent, or Firm*—Pennie & Edmonds

[57] ABSTRACT

By the addition of a small quantity of potassium chloride or arsenous sulfide to commercial grades of molten potassium nitrate, the potassium nitrate may be activated or purified sufficiently to produce strengthened glass by ion exchange equal to glass strengthened by use of highly purified laboratory reagent grades of potassium nitrate.

3 Claims, No Drawings

STRENGTHENING SHEET GLASS BY ION EXCHANGE

BACKGROUND OF THE INVENTION

The invention relates to an improved method for activating or reactivating potassium nitrate for use in the ion exchange method of strengthening sheet glass.

Glass sheets have previously been strengthened by the well known ion exchange method in which glass sheets are emersed in a molten bath of potassium nitrate. The potassium nitrate, however, must be of a highly purified variety such as that used in the laboratory reagent grades. Untreated commercial grades of potassium nitrate such as NF grade or high "K" technical grade potassium nitrate do not serve to strengthen sheet glass and, additionally, the treatment may result in staining.

In U.S. Pat. No. 3,415,637 a successful commercial method of activating commercial grades of potassium nitrate or reactivating contaminated highly purified grades of potassium nitrate is disclosed. As disclosed in U.S. Pat. No. 3,415,637, potassium nitrate of a commercial grade could be activated or purified by the addition thereto of a small quantity of potassium silicate. The amount of potassium silicate added to the potassium nitrate being dictated by the degree of contamination of the potassium nitrate with impurities, notably lithium. It has now been found that potassium chloride and arsenous sulfide may be advantageously used to activate or purify commercial grades of potassium nitrate.

SUMMARY OF THE INVENTION

A small quantity of $As_2S_3$ or KCl is added to a commercial grade of molten $KNO_3$ to activate or purify the potassium nitrate thus making it suitable for strengthening glass by the ion exchange method. The quantities of arsenous sulfide or potassium chloride used depend upon the degree of contamination of the potassium nitrate and also upon which of the two purifying agents is being used. For example, 0.2% $As_2S_3$ will show improved results with N.F. grade potassium nitrate supplied by Stauffer Chemical Company (hereinafter referred to as "A" salt); however, about 0.4% $As_2S_3$ is required to fully activate the same. With high K Technical Grade potassium nitrate (hereinafter referred to as "B" salt) supplied by Southwest Potash Company, full activation is achieved using 1.2% arsenous sulfide although lesser quantities do show some improvement. For full activation a 0.6% addition of potassium chloride to the A salt is required and 1.1% addition of potassium chloride is required for full activation of the B salt.

DESCRIPTION OF THE PREFERRED EMBODIMENTS

Arsenous Sulfide in A Salt

A 3½ quart stainless steel beaker was filled with 2000 grams of the A salt, the salt melted and the temperature of the bath was held at 485°C. 1 × 5 inch single strength window glass samples were treated in this bath for 20 hours. After treatment they were found to be stained and to have zero stress. Four grams of $As_2S_3$ were slowly added to the molten potassium nitrate thus giving an equivalent of 0.2% $As_2S_3$ in the bath. After complete decomposition had occurred additional 1 × 5 inch samples of single strength window glass were treated in the bath for 20 hours at 485°C. At the end of this treatment the glass samples were removed, washed, dried and examined. A stress of 0.7950 kg./mm.$^2$ was measured in each of the samples of those treated; however, all of the samples had a light stain on their surfaces.

Another 4 grams of $As_2S_3$ was added to the bath making a total of 0.4% by weight $As_2S_3$ in the bath. The test was again repeated with new 1 × 5 inch pieces of single strength glass for 20 hours at 485°C. Upon completion of this treatment, examination of the glass samples showed them to be free from any stain and to have a stress of 0.8215 kg./mm$^2$. This value is considered to be normal and is the same as produced in a bath of highly purified grades of potassium nitrate such as a CP grade. The permanence of this activation or purification of the A salt by the 0.4% of $As_2S_3$ was tested daily over a period of 2½ months with a total of 41 treatments. During all of this period no surface stain was noted and the stress in the glass treated was 0.8215 kg./mm$^2$.

In another experiment the arsenous sulfide concentration was increased to 0.8% by weight. 1 × 5 inch single strength glass samples were treated at 485°C for 20 hours. The test yielded a stress of 0.8215 kg./mm$^2$ with no surface stain. It will be seen, therefore, that with the A salt no advantage is gained in adding more then about 0.4% of arsenous sulfide. Although, no disadvantage is experienced either. The upper limit of the quantity of arsenous sulfide employed is, essentially economical once full action of the salt has been achieved.

Arsenous Sulfide in B Salt

A 2,000 gram bath of the B salt was prepared by melting the same in a 3½ 2 quart stainless steel beaker at 485°C. Then 1 × 5 inch single strength sheet glass samples were treated in this bath for 20 hours at 485°C. Upon completion of the treatment it was found that the samples were heavily stained and with zero stress. Ten grams of arsenous sulfide (equivalent to 0.5% by weight) were added to the molten B salt. 1 × 5 inch single strength glass samples were again treated in the bath for 20 hours at 485°C. Upon completion of the treatment the samples showed a lightly stained surface and a stress of 0.6095 kg./mm$^2$. An additional 2 grams of $As_2S_3$ was added to the bath leaving a total of 0.6% $As_2S_3$. Again, 1 × 5 inch single strength glass samples were treated in the molten B salt for 20 hours at 485°C. Examination upon completion of the treatment showed these samples to have a good surface with a stress of 0.7400 kg./mm$^2$.

The amount of arsenous sulfide was then increased to 0.8% tested and then increased further to 1.0%. At 1.0% the glass samples showed a stress of 0.7950 kg./mm$^2$ after 20 hours at 485°C. Finally, the arsenous sulfide was increased to 1.2% by weight in the B salt bath and 1 × 5 inch single sheet strength glass samples treated in this bath for 20 hours at 485°C. These samples (in the bath containing 1.2% by weight) showed a stress of 0.8215 kg./mm$^2$ with stain free surfaces. Thus, it takes approximately three times the amount of arsenous sulfide to activate the B salt as it does to activate the A salt.

Potassium Chloride in A Salt 2,000 grams of the A salt were melted in a 3½ quart stainless steel beaker at 485°C. 1 × 5 inch single strength window glass samples were treated in this molten A salt for 20 hours at 485°C. Upon examination they were stained and developed no stress. 4 grams (0.2%) of potassium chloride was added to the bath and single strength glass samples 1 × 5 inch were again tested for 20 hours at 485°C but they developed no stress and were stained. An additional 4 grams of potassium chloride was added to the A salt bath making a total of 8 grams (0.4%) then in the bath. Again single strength window glass samples 1 × 5 inch were treated for 20 hours at 485°C and upon examination the samples were found to be stain free and to have developed a stress of $0.7685$ kg./mm$^2$.

Further addition of 4 grams of potassium chloride was made to the A salt bath making a total of 12 grams (0.6%) in the molten bath. Single strength glass sheets 1 × 5 inch were again treated for 20 hours at 485°C and were found to be free from surface stain and to have the normal stress of $0.8215$ kg./mm$^2$.

The last bath (A salt having 0.6% by weight of potassium chloride) was then retested 13 times over the succeeding three (3) weeks and in all of the tests the glass treated had good surfaces and the stress remained at $0.8215$ kg./mm$^2$.

Potassium Chloride in B Salt 2,000 grams of B salt was melted at 485°C in a 3½ quart stainless steel beaker. Single strength window glass samples 1 × 5 inch were treated for 20 hours at 485°C in this B bath. After treatment they were found to be heavily stained and to produce no stress. An addition of 1.0% potassium chloride by weight (20 grams) was added to this bath and glass samples of the same kind were treated for 20 hours at 485°C and upon completion of the treatment were found to be stained and have no stress. An additional 0.3% potassium chloride was added to the bath making a total of 1.3% by weight in the bath. Glass samples treated for the same time and temperature as previously, developed no stress and were stained. A further addition of 0.7% potassium chloride was made to the bath making a total of 2.0% in the B salt bath. Single strength glass samples were again tested for the same time and temperature. The surface after treatment was found to be slightly etched but not stained. No stress was developed. A further addition of 0.3% potassium chloride (a total of 2.3%) showed a slight surface improvement but still no stress was developed in the glass. With an additional 0.7% potassium chloride (a total of 3.0%) added to the bath, tests showed no improvement either in stain or stress. With the addition of an additional 1.0% potassium chloride (for a total of 4% potassium chloride in the bath) the single strength window glass samples were treated for 20 hours at 485°C, they showed a surface that was lightly pitted and a stress had developed of $0.5890$ kg./mm$^2$. With the addition of another 1.0% potassium chloride by weight to the bath (a total of 5% potassium chloride in the B salt) the glass samples were shown, after treatment, to have a good surface with no stains or pits and the stress developed was $0.6360$ kg./mm$^2$. With a still further addition of 1.0% of potassium chloride (a total of 6%) no improvement in the stress was noted over the previous test. At 7% by weight of potassium chloride in the B salt bath the glass treated had good surface and a stress of $0.7420$ kg./mm$^2$.

Addition of 1.0% potassium chloride was made daily to the bath until there was a total of 10% by weight of potassium chloride in the B salt bath. At this level treatment of the glass samples produced stain free surfaces and a stress of $0.7950$ kg./mm$^2$.

Finally, with the addition of still another 1.0% potassium chloride by weight (the B bath now having 11% potassium chloride by weight) single strength window glass samples treated in this bath for 20 hours at 485°C developed the normal stress of $0.8215$ kg./mm$^2$ with good surfaces. Thus it takes 11% potassium chloride to completely activate the B salt of potassium nitrate while only 0.6% of potassium chloride is required to activate the A salt bath.

Thus it will be seen that both arsenous sulfide and chloride will fully activate commercial grades of potassium nitrate salt making these salts suitable for chemical strengthening of soda-lime glass by ion exchange. Further, the potassium salts so treated do not stain or attack the glass surface being treated. Tests have also shown that once the potassium nitrate bath has been purified to the extent that it strengthens the glass samples to a value of $0.8215$ kg./mm$^2$ with good surfaces no further improvement is obtained by further additions of arsenous sulfide or potassium chloride.

It is believed that calcium and magnesium impurities in potassium nitrate react with the potassium chloride to form calcium chloride and magnesium chloride respectively. Calcium chloride has a melting point of 772°C and a boiling point of 1600°C and magnesium chloride has a melting point of 712°C and a boiling point of 1,412°C, all of which temperatures are well above the operating range of the potassium nitrate salt bath which is generally operating between about 400°C to about 500°C. It is further believed that the arsenous sulfide combines with calcium and magnesium to form, respectively, calcium sulfate with a melting point of 1,450°C and magnesium sulfate with a melting point of 1,185°C. The precise chemistry involved in supressing the deleterious effects of calcium and magnesium impurities in commercial grades of potassium nitrate is not known; however, as the tests above clearly show the arsenous sulfide and potassium chloride do serve to make these commercial grades of potassium nitrate useable.

For an activator or purifier for such salts to be suitable, it must render the salt capable of producing stress in soda-lime glass equal to that produced by reagent of CP grades of potassium nitrate salts under the same conditions. Further, the activator of commercial grades of potassium salt must produce a suitable bath that will not stain, pit, etch or otherwise attack the surface of the glass being treated. Lastly, the activator should be permanent in the molten potassium nitrate bath.

A number of other compounds have also been tested as possible activators for commercial grades of potassium nitrate salt for use in strengthening of soda-lime glass by ion exchange. Some of the compounds tested were sodium silicate, copper nitrate, potassium chromate, potassium bromide, arsenic pentoxide, arsenic trioxide, potassium bisulfate, stannic oxide and sulfur dioxide. None of these met these requirements for complete activation of commercial grades of potassium nitrate salts.

We claim:

1. In the method of activating a molten bath of chemically impure potassium nitrate for use in strengthening glass by an ion exchange method, the improvement comprising adding to said molten potassium nitrate bath, an effective amount of potassium chloride or arsenous sulfide to remove substantially all of the calcium and magnesium impurities as compounds that are insoluble in potassium nitrate.

2. The method of claim 1 in which the effective amount of arsenous sulfide added to the chemically impure potassium nitrate bath is at least 0.4% by weight of the potassium nitrate.

3. The method of claim 1 in which the effective amount of potassium chloride added to the chemically impure potassium nitrate bath is at least 0.6% by weight of the potassium nitrate.

* * * * *

UNITED STATES PATENT AND TRADEMARK OFFICE
CERTIFICATE OF CORRECTION

PATENT NO. : 3,930,820
DATED : January 6, 1976
INVENTOR(S) : William C. Cooke and Albert H. Agett It is certified that error appears in the above—identified patent and that said Letters Patent are hereby corrected as shown below:

Change column 2, line 39 from "3-1/2 2 quart"

to -- 3-1/2 quart --

Signed and Sealed this twenty-seventh Day of April 1976

[SEAL]

Attest:

RUTH C. MASON
Attesting Officer

C. MARSHALL DANN
Commissioner of Patents and Trademarks